(12) United States Patent
Matsumoto et al.

(10) Patent No.: US 8,059,868 B2
(45) Date of Patent: Nov. 15, 2011

(54) LICENSE PLATE RECOGNITION APPARATUS, LICENSE PLATE RECOGNITION METHOD, AND COMPUTER-READABLE STORAGE MEDIUM

(75) Inventors: Hideaki Matsumoto, Ichikawa (JP); Ichiro Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 12/039,417

(22) Filed: Feb. 28, 2008

(65) Prior Publication Data

US 2008/0212837 A1  Sep. 4, 2008

(30) Foreign Application Priority Data

Mar. 2, 2007  (JP) ................................ 2007-053049

(51) Int. Cl.
*G06K 9/00* (2006.01)
(52) U.S. Cl. .......................... 382/105; 382/104; 382/229
(58) Field of Classification Search .................. 382/105, 382/229
See application file for complete search history.

(56) References Cited

U.S. PATENT DOCUMENTS 6,185,338 B1 * 2/2001 Nakamura ..................... 382/229
6,754,369 B1 * 6/2004 Sazawa .......................... 382/105

FOREIGN PATENT DOCUMENTS

| JP | 61-176808 A | 8/1986 |
| JP | 6-215293 A | 8/1994 |
| JP | 08-190690 A | 7/1996 |
| JP | 9-288795 A | 11/1997 |
| JP | 11-073514 A | 3/1999 |
| JP | 2003-216958 A | 7/2003 |
| JP | 2005-182236 A | 7/2005 |

\* cited by examiner

*Primary Examiner* — Tom Y Lu
(74) *Attorney, Agent, or Firm* — Canon U.S.A. Inc., I.P. Division

(57) ABSTRACT

A license plate recognition apparatus includes a detection unit configured to detect a plurality of quadrangles of license plate region candidates from input images, a character recognition unit configured to execute character recognition of a character region included in the license plate region candidate detected, and an output unit configured to select a license plate region candidate to be output from among the plurality of license plate candidates detected by the detection unit based on the character recognition result and information of the quadrangle of the respective license plate region candidates and output information relating to the license plate region candidates selected.

18 Claims, 17 Drawing Sheets

NORMAL LICENSE PLATE

EXAMPLE THAT RIGHT END NUMERAL OF SERIES OF DESIGNATED NUMBER IS ABSENT

EXAMPLE THAT IMAGE OF SCREW IS MISRECOGNIZED AS CHARACTER

CHARACTER RECOGNITION RESULT: 三湘南300ひ111 ~1202

RECOGNITION CORRECTION RESULT: 湘南300ひ111 ~1203

LICENSE PLATE RECOGNITION APPARATUS, LICENSE PLATE RECOGNITION METHOD, AND COMPUTER-READABLE STORAGE MEDIUM

BACKGROUND OF THE INVENTION

1. Field of the Invention

The present invention relates to an apparatus configured to read a license plate automatically from an image, a method and a program therefor.

2. Description of the Related Art

Conventionally, a fixed camera provided at a position above a road photographs a vehicle in order to read a license plate of the vehicle for the purposes of traffic control. For example, it is possible to read a license number of the vehicle passing through the plurality of road points and obtain a travel time and/or an average speed between road points by searching for an identical license number from a list of read results at the respective road points. In addition, this method can be used for an automated toll collecting system for a toll road.

When a license plate is read using such a fixed camera, since the license plate is photographed from the same angle, to a certain degree with a similar background, the license plate can be detected with relatively high accuracy.

In addition, it is discussed to photograph a plurality of images and to recognize the license plate that seem to belong to a same vehicle. When the plurality of images is identical with each other, the result is regarded as a final recognition result so that a recognition rate is improved (Japanese Patent Application Laid-Open No. 9-288795).

In addition, Japanese Patent Application Laid-Open No. 11-073514 discusses a technique for detecting a license plate region candidate by detecting a straight line of a frame of the license plate from an image using Hough transform and recognizing characters by performing a keystone correction.

In addition, Japanese Patent Application Laid-Open No. 6-215293 discusses a technique for obtaining a vertical edge image by differentiating in the horizontal direction and detecting a position of a license plate from the edge image.

However, it is not easy to detect the license plate from an image photographed by an unfixed camera such as a commercially available digital camera because a photographing condition (e.g., photographing angle, luminance, background) thereof is variable. In addition, miscellaneous images may be included in the images photographed by the unfixed camera in addition to the license plate. For instance, if an object similar to a license plate is included in a photographed image, it becomes difficult to determine whether the object is the license plate.

For instance, when trying to detect a license plate region by detecting a frame of the license plate, a region having a rectangular frame such as a headlight part or a front grill of a vehicle may be incorrectly detected as the license plate region. In addition, when characters are recognized while detecting character blocks, for instance, commercial message characters written on a body of commercial vehicles may be incorrectly recognized as license plate characters. In cases where characters on signboards of shops in the background are photographed in an image, character strings of these signboards may be incorrectly detected as the character strings of the license plate.

In addition, when a user photographs a vehicle using a digital camera or the like, the same vehicle is not always photographed several times. Further, there is a possibility that the license plate is photographed from various angles.

SUMMARY OF THE INVENTION

The present invention makes it possible to recognize a license plate with high accuracy by detecting some candidates of a license plate region from images and comparing these candidates to narrow down to a probable license plate region.

According to an aspect of the present invention, a license plate recognition apparatus includes a detection unit configured to detect a plurality of quadrangles of license plate region candidates from input images, a character recognition unit configured to execute character recognition of a character region included in the detected license plate region candidates, and an output unit configured to select a license plate region candidate to be output from among the plurality of license plate region candidates detected by the detection unit based on a character recognition result and information of the quadrangle of the respective license plate region candidates and output information relating to the selected license plate region candidate.

According to an exemplary embodiment of the present invention, detection accuracy and recognition accuracy of a license plate region are improved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
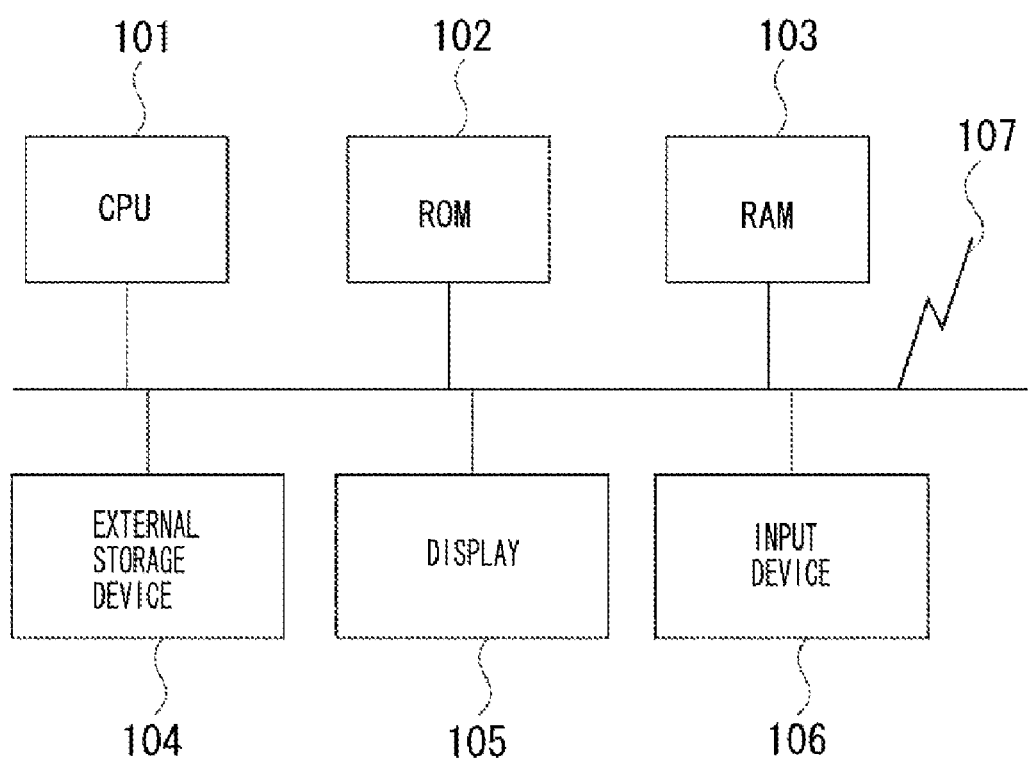
FIG. 1 is a block diagram illustrating a configuration of a license plate recognition apparatus according to an exemplary embodiment of the present invention.

FIG. 1 is a block diagram illustrating a configuration of a license plate recognition apparatus according to an embodiment of the present invention.

A central processing unit (CPU) 101 executes a control program stored in a read only memory (ROM) 102 to control the present apparatus. The ROM 102 stores a computer program and various types of parameter data executed by the CPU 101. The computer program being executed by the CPU 101 causes the apparatus (computer) to function as various types of units to execute each processing in flowcharts described later. In the present exemplary embodiment, processing corresponding to respective steps in the flowcharts is implemented as software using the computer (CPU), but any part or all of the processing can also be implemented by hardware such as electronic circuits. In addition, the license plate recognition apparatus of the present invention can be implemented using a general-purpose personal computer or can be an apparatus for dedicated license plate recognition.

A random access memory (RAM) 103 stores images and various types of information. In addition, the RAM 103 functions as a work area of the CPU 101 and a temporary storage area of data.

An external storage device 104 stores various types of data such as dictionaries. The external storage device 104 includes, for instance, a hard disk, compact disk-read only memory (CD-ROM) or the like. A computer program which causes the computer to implement the apparatus of the present invention can be stored in a computer readable external storage medium and provided via a network. A display 105 includes, for instance, a liquid crystal display (LCD) or a cathode ray tube (CRT).

An input device 106 can be an interface for connecting an image input device, such as a digital camera or a scanner, or can be an image input device itself such as the digital camera. In addition, in order to serve as one function of the digital camera, an apparatus according to the exemplary embodiment of the present invention can be incorporated in the inside of the digital camera.

A network interface (I/F) 107 communicates with external devices (e.g., a server, the external storage device, the image input device) connected to the network, and reads and writes programs and data. The network is typically a so-called communication network, such as an internet, a local area network (LAN), a wide area network (WAN) or a telephone line, and needs to be able to send and receive data. In addition, the display 105 and the input device 106 can be connected via a network interface.

Figure 2:
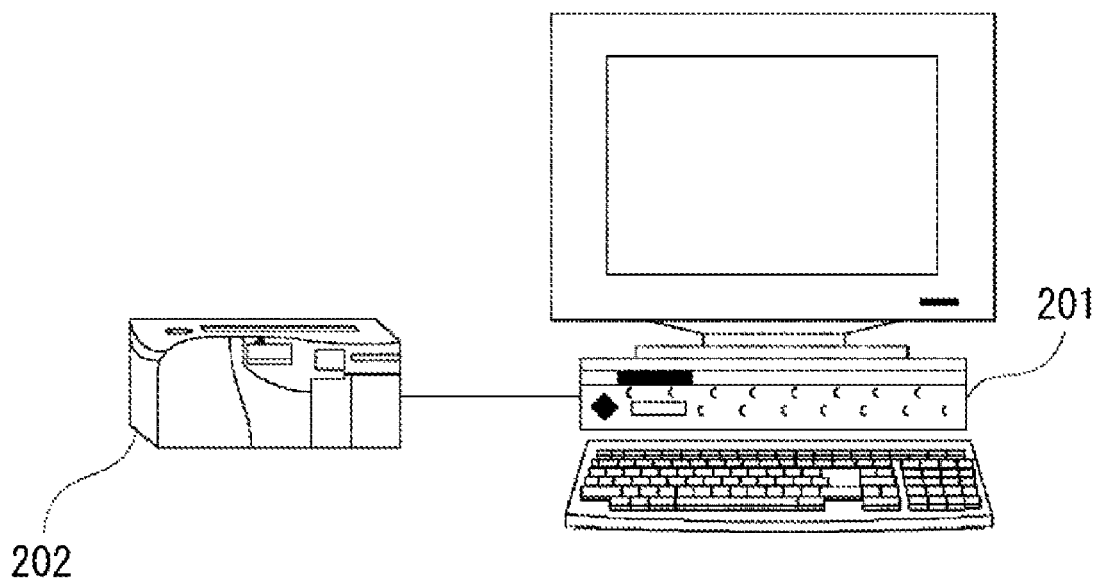
FIG. 2 is a system diagram illustrating a configuration of the license plate recognition apparatus according to an exemplary embodiment of the present invention.

Such a license plate recognition apparatus is implemented, for instance, in a system such as the one illustrated in FIG. 2. FIG. 2 illustrates a configuration example of a computer system according to an exemplary embodiment of the present invention. A computer device 201 executes processing for license plate recognition while receiving image data photographed by a digital camera 202.

Next, the license plate recognition processing will be described referring to FIGS. 3 to 9 and 14. In the present exemplary embodiment, a character string of the license plate in a still image photographed by a digital camera or the like is recognized.

Figure 3:
FIG. 3 is a view illustrating an example of the license plate according to an exemplary embodiment of the present invention.

FIG. 3 is an example of a license plate in Japan. In the case of Japanese license plate, there are three character string regions, namely a region 301 for a name of the Department of Motor Vehicles and a classification number, a region 302 for a Japanese Hiragana character (or alphabet), and a region 303 for a designated number composed of a series of digits. In the case of the Japanese license plate, the name of the Department of Motor Vehicles 301 is written at a position above the designated number region 303.

In the case of license plates in the United States of America, license plates are issued by the Department of Motor vehicles for the state in which the vehicle is being registered. Such license plates have various designs for each state. Furthermore, each individual state may have license plates of various designs. For example, a state may use one design for a period of years and then use another format for a subsequent period of years.

Figure 14A:
FIGS. 14A-14E illustrate an example of a license plate in the United States of America.
Figure 14B:
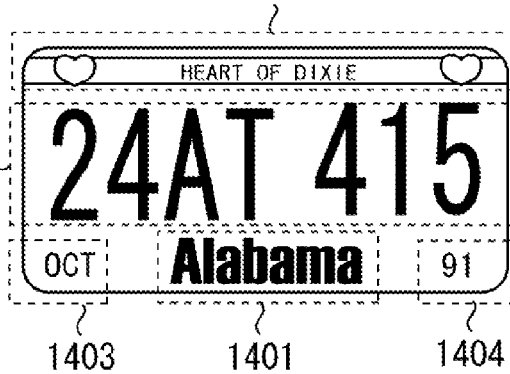
Figure 14C:
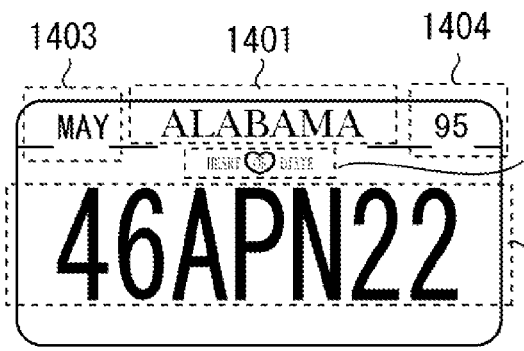
Figure 14D:
Figure 14E:
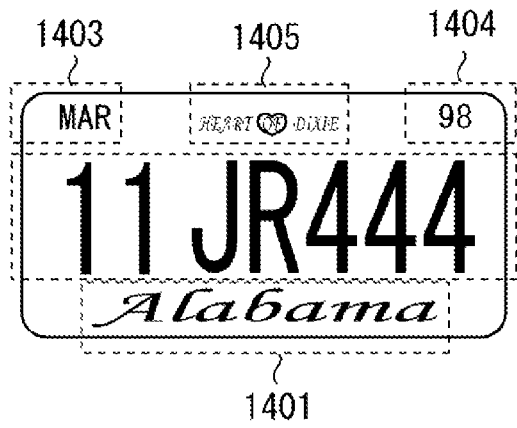

FIGS. 14A 14E illustrate examples of license plates in the United States of America. In particular, the examples illustrated in FIGS. 14A-14E show examples of license plates for the state of Alabama. As shown in FIGS. 14A-14E, each of the license plates includes a character region 1401 where a name of the state is written and a region 1402 where a unique identification number composed of a series of digits and/or letters is written. Some states also allow for a limited set of symbols to be optionally included in the series of digits and/or letters. Such symbols are not considered a portion of the series of letters and/or digits for determining the unique series of digits and/or letters. The region 1401 where the name of the state is written is often written above or below the region 1402 where the series of digits and/or characters are written.

Additionally, the exemplary plates shown in FIGS. 14A-14E include a month of registration region 1403 and a year of registration region 1404 where stickers from the Department of Motor Vehicles are applied upon registration of the vehicle. The month of registration region 1403 and year of registration region 1404 may appear above or below the region containing the unique series of digits and/or characters 1402.

Furthermore, as shown in the examples of FIGS. 14A-14E, a license plate for a given state in the United States may include one or more regions 1405 where symbols, mottos or the like may be written. Such symbols, mottos, etc. may be written in a single region or multiple regions. The region(s) with the symbols, mottos or the like 1405 may appear above or below the region containing the unique series of digits and/or characters 1402.

Furthermore, while the background of the plates shown in FIGS. 14A-14E is solid, it will be appreciated that the background of the license plate may not be a solid color, e.g., the background may contain a silhouetted image.

Figure 4:
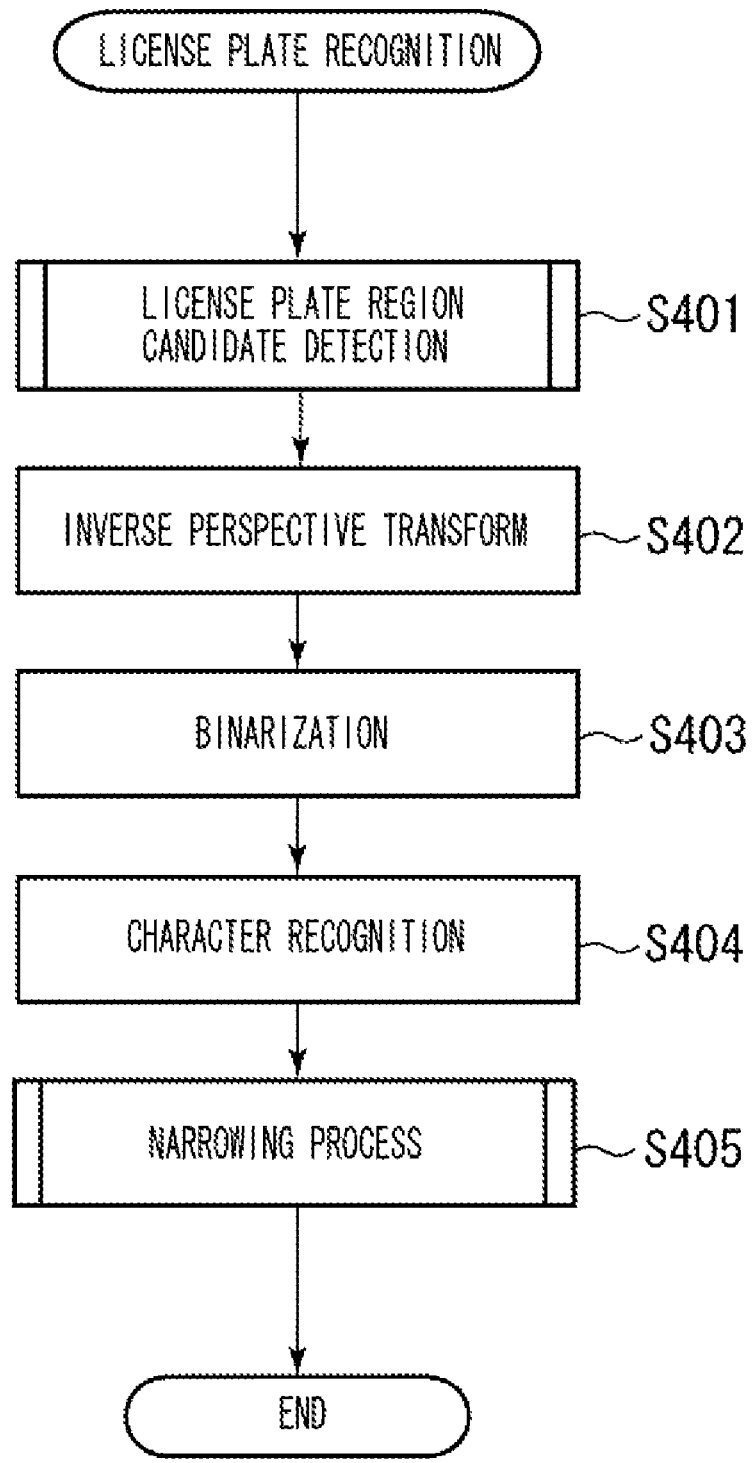
FIG. 4 is a flowchart illustrating license plate recognition processing according to an exemplary embodiment of the present invention.

FIG. 4 is a flowchart illustrating license plate recognition processing in the license plate recognition apparatus according to an exemplary embodiment of the present invention.

In step S401, the CPU 101 of the license plate recognition apparatus detects plural candidates of the license plate region from images of the photographs. The processing performed in step S401 will be described in detail referring to the flowchart of FIG. 13.

Figure 13:
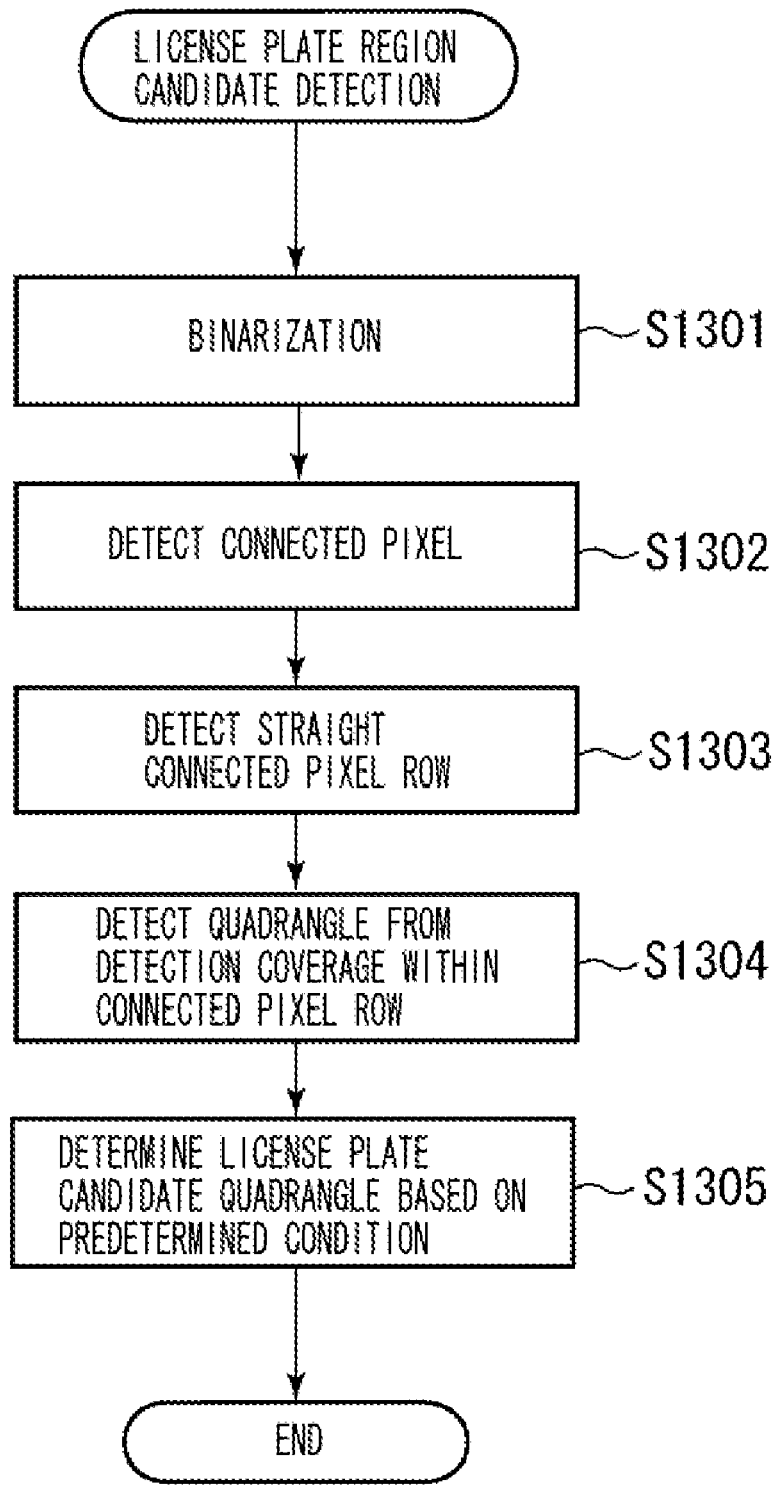
FIG. 13 is a flowchart of license plate region candidate detection processing according to an exemplary embodiment of the present invention.

In step S1301 in FIG. 13, the CPU 101 binarizes the image.

In step S1302, the CPU 101 detects connected pixels of black pixels (black pixel block) which is connected with each other in one direction among the eight directions: vertical directions, lateral directions, or four slanting directions from the binarized images. Further, the CPU 101 determines whether there is a white pixel block connected in one direction among the four directions: vertical directions or lateral directions inside the black pixel block detected. If it is determined that there is the white pixel block, the CPU 101 inspects whether there is an additional black pixel block inside the white pixel block and extracts internal black pixel block.

In step S1303, the CPU 101 detects plural connected pixels (connected pixel row) having a predetermined size and arranged straight among the connected pixels of the black pixels detected. The connected pixel row is a candidate of a character string of the license plate. The predetermined size used for a threshold value of detection object is set beforehand while presuming the size of characters (numbers) of the license plate to be photographed.

Figure 10:
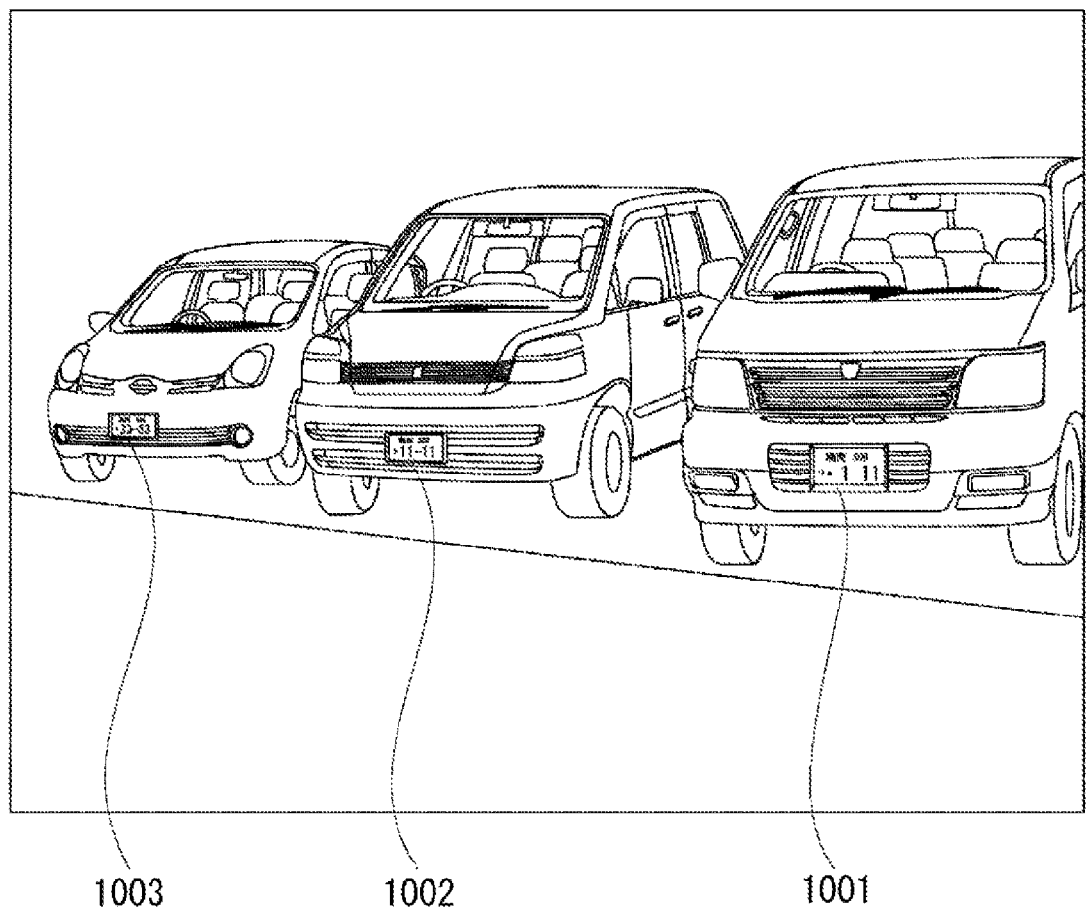
FIG. 10 is an example of an input image.

FIG. 10 illustrates an example of an input image that is to be a processing object of the license plate detection processing. In step S1303, the rows of the connected pixels of the black pixel corresponding to the respective characters/numbers within license plates 1001 to 1003 are detected as the candidates from the binarized input images. FIG. 10 illustrates a photograph of vehicles with Japanese license plates, but even the case of the license plate of the United States of America, processing is the same as that of Japan. That is, the row of the connected pixel having a predetermined size and arranged straight is detected as a candidate character string. It will be appreciated that while the description herein describes black characters, the characters may be other colors that are distinguishable from the background. Furthermore, the colors may be a lighter color than the background.

In step S1304, the CPU 101 determines a predetermined range from the detected row of the connected pixels as a processing object region of quadrangle detection and executes quadrangle detection processing. For instance, a region having two times the horizontal and vertical sizes of the connected pixel row is determined as the processing object region.

First, the quadrangle detection processing detects straight lines by using the Hough transform for the image in the determined processing object range. In the straight line detection, the straight line detection processing is performed by gradually changing the threshold value for detecting the straight line until the straight lines more than the predetermined numbers (for instance, eight) are detected. One or more quadrangles are formed using the straight lines detected. Since the input image is not necessarily the image photographed from the front of the license plate, the quadrangle is not necessarily a rectangle.

In step S1305, the CPU 101 determines a quadrangle meeting predetermined conditions as a license plate region candidate. For instance, a ratio of sides of the quadrangle detected in step S1304 is compared with a ratio of sides (reference value) of the license plate, and the quadrangle whose ratio of the sides differs widely is eliminated from the license plate region candidate.

Figure 11:
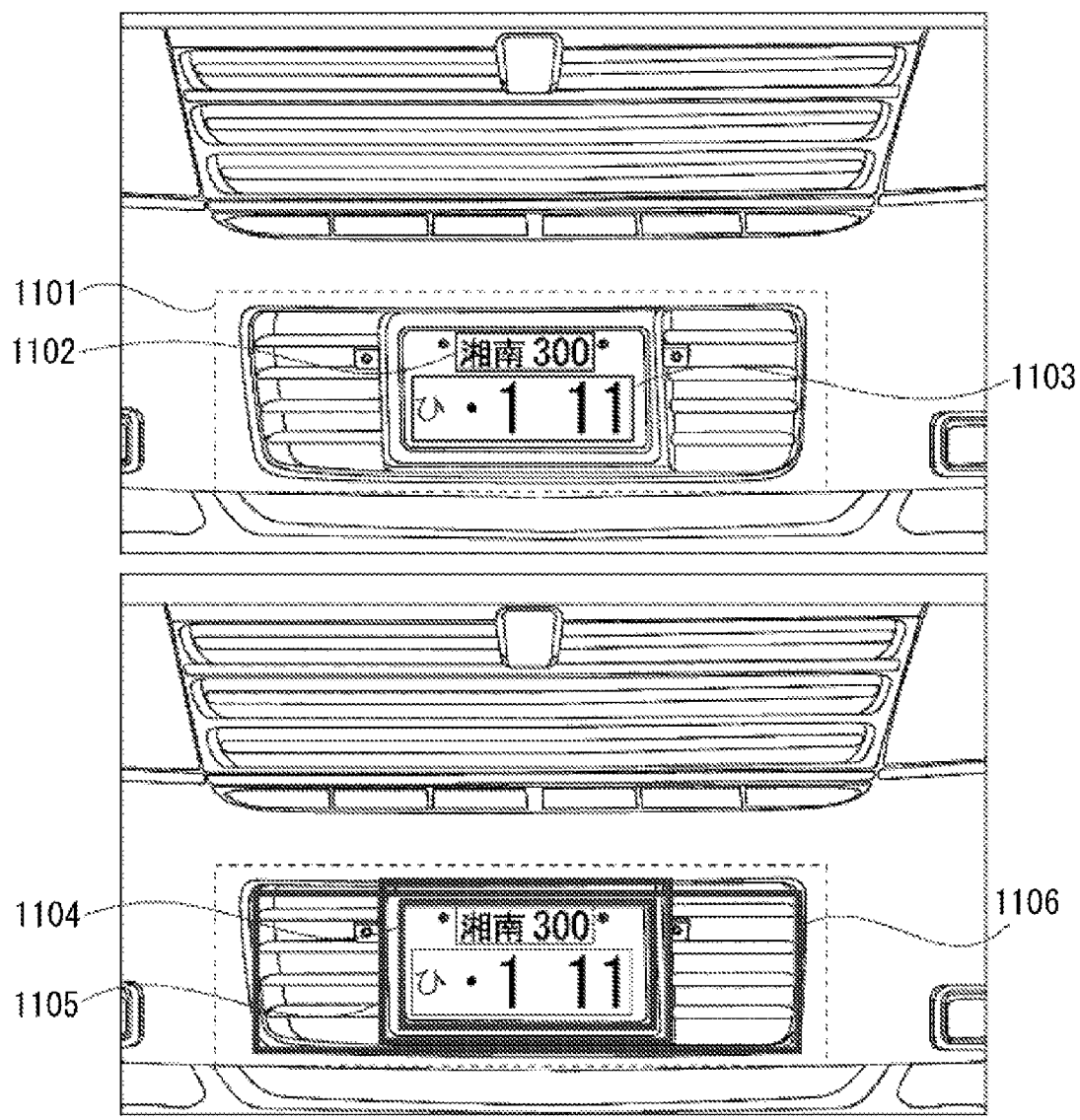
FIG. 11 is enlarged views of example input images.
Figure 15:
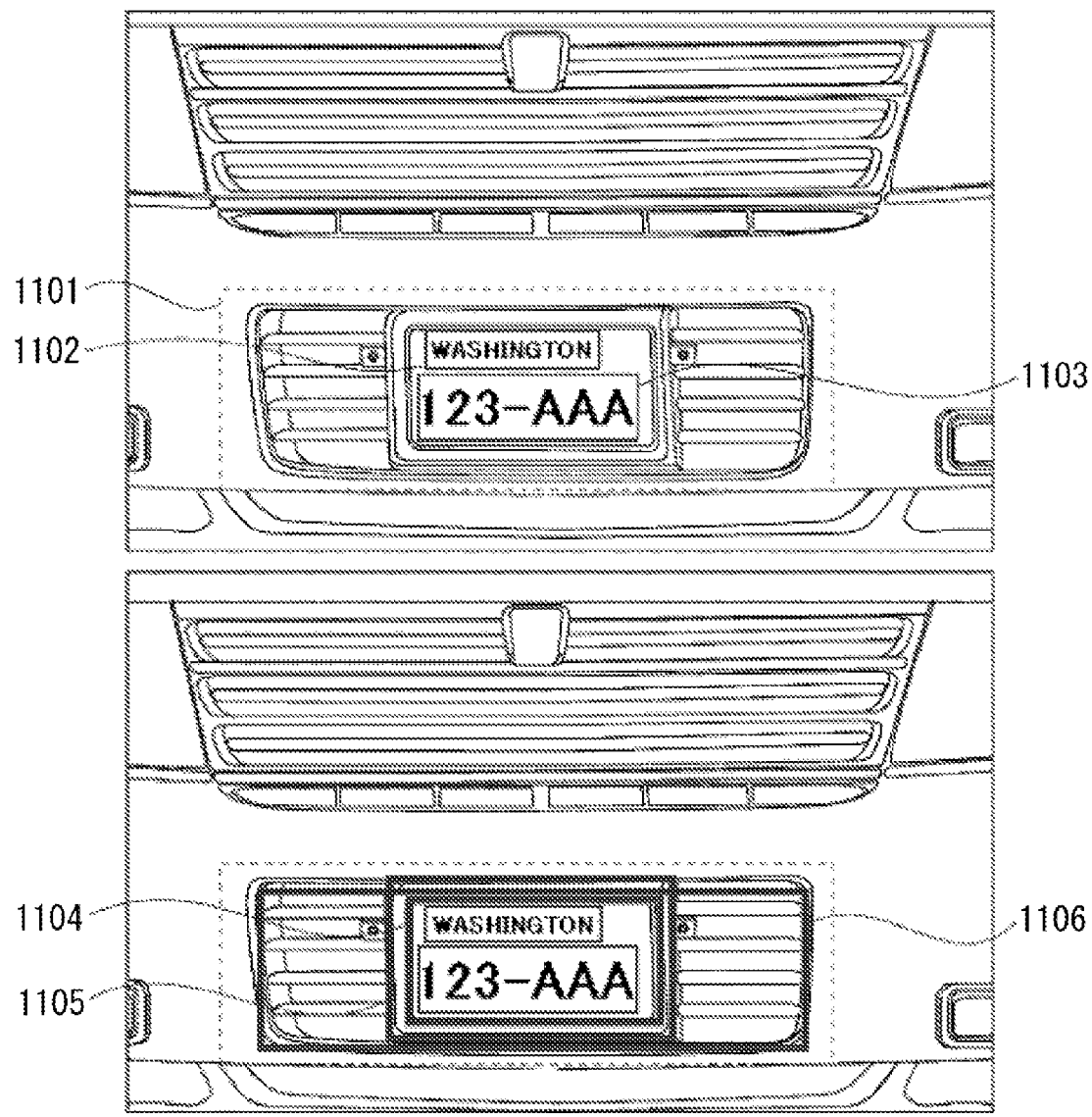
FIG. 15 is example images of a vehicle with an American license plate.

FIG. 11 illustrates enlarged views near the license plate 1001 of FIG. 10. For instance, the connected pixel rows 1102, 1103 are detected in step S1303. At this time, in step S1304, the CPU 101 determines a processing object region 1101 based on the connected pixel rows 1102, 1103 and detects quadrangles 1104 to 1106 by executing quadrangle detection processing. Then, in step S1305, the CPU 101 examines a ratio of sides of respective quadrangles, as a result, the quadrangles 1104, 1105 are determined as the license plate region candidates because it is determined that the ratio of sides of the quadrangle 1106 is largely different from the reference value of the license plate. FIG. 15 is an example of a vehicle with an American license plate. Descriptions of steps S1101 to S1106 of FIG. 15 are the same as descriptions of FIG. 11 as described above.

A technique for detecting the license plate region candidates can be used in conjunction with techniques other than that described above to detect a number of license plate region candidates. For instance, it is possible to use a method for detecting the license plate region by detecting a frame of the license plate, or a method for detecting the license plate region with template matching. The license plate region candidate detected by these methods is detected in a region of the quadrangle.

In step S402, the CPU 101 obtains a front view image by performing an inverse perspective transform (distortion correction processing) on the plurality of detected license plate region candidates (quadrangle region).

In step S403, the CPU 101 binarizes the front view image of the plurality of license plate region candidates obtained in step S402.

In step S404, the CPU 101 extracts character regions as illustrated in FIGS. 3 and 14 from the license plate region subjected to the inverse perspective transform and the binarization, performs character recognition processing on the character region, and obtains the character candidate with a similarity degree of the respective characters (and numbers). On the region determined as describing a name of the state based on a result of the character recognition processing, the CPU 101 performs collation with a dictionary storing the name of the states that can be written in the license plate. The character candidate which is determined as misrecognition as a result of the collation, is corrected to a right name of the state.

Figure 12:
FIG. 12 is an enlarged view of an example of a license plate region candidate.
Figure 16:
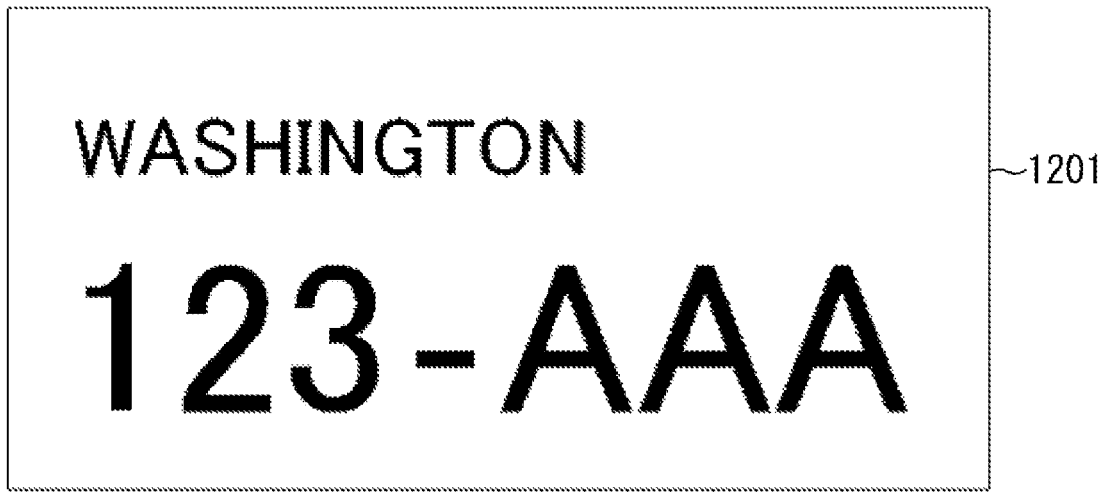
FIG. 16 is an enlarged view of an example of a license plate region candidate.

An enlarged view 1201 of FIG. 12 is a quadrangle 1104 that is the license plate region candidate in FIG. 11. Further, an enlarged view 1201 of FIG. 16 a quadrangle 1104 that is the license plate region candidate in FIG. 15. If the character recognition processing is executed to the character region extracted from the license plate region candidate, a character recognition result 1202 is obtained. At this time, there is a possibility of misrecognition in the character recognition result. Therefore, the CPU 101 further performs a word collation with the dictionary storing the name of the Department of Motor Vehicle and the name of the states, and corrects the character determined as the misrecognition based on similarity of the word collation result and the character recognition result. As an example, misrecognized character in a character recognition result 1202 of FIG. 12 is corrected and a recognition result 1203 is obtained.

In step S405, the CPU 101 narrows down the license plate region candidates (selection of the license plate region candidates) using the character recognition result, position information of the respective characters, shape information of the quadrangle or the like obtained from the license plate region candidates. Then, the CPU 101 outputs information (character recognition result or position information or the like) relating to a probable license plate region obtained as the narrowing down processing result.

Next, details of narrowing down processing of step S405 will be described referring to FIGS. 5 to 9.

Figure 5:
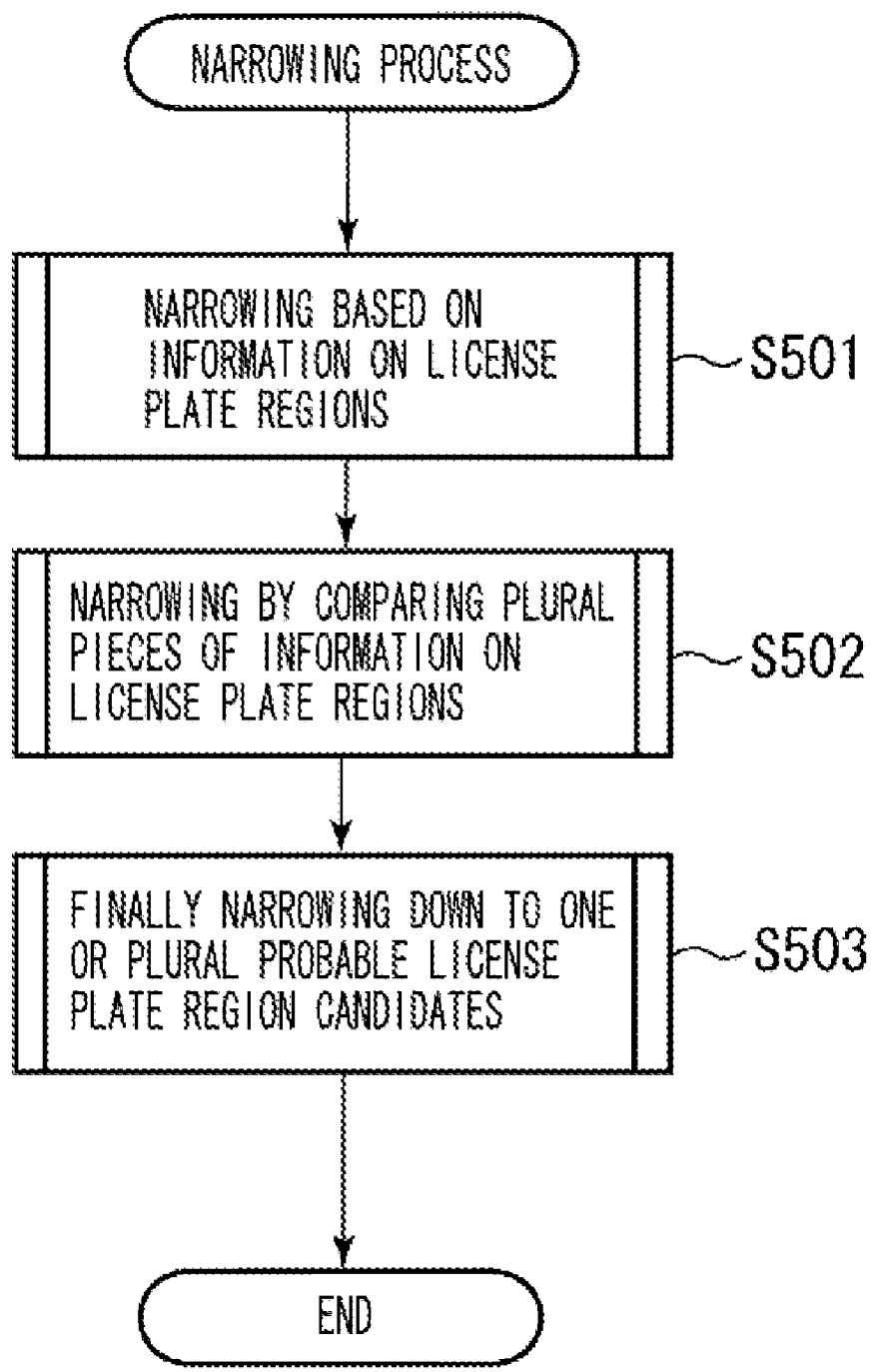
FIG. 5 is a flowchart illustrating narrowing down processing according to an exemplary embodiment of the present invention.
Figure 6:
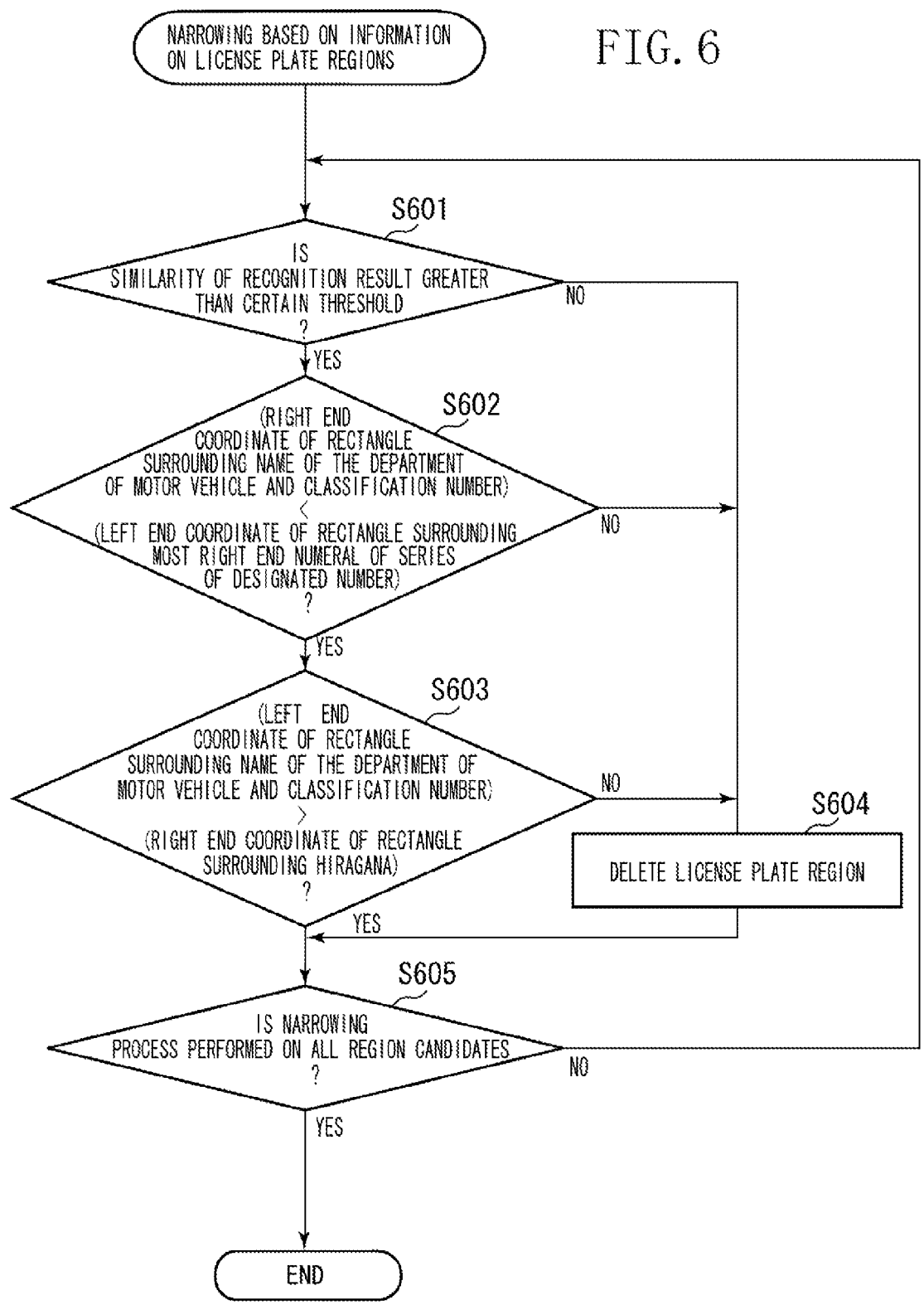
FIG. 6 is a flowchart of the narrowing down processing from information of an individual license plate region candidate according to an exemplary embodiment of the present invention.
Figure 17:
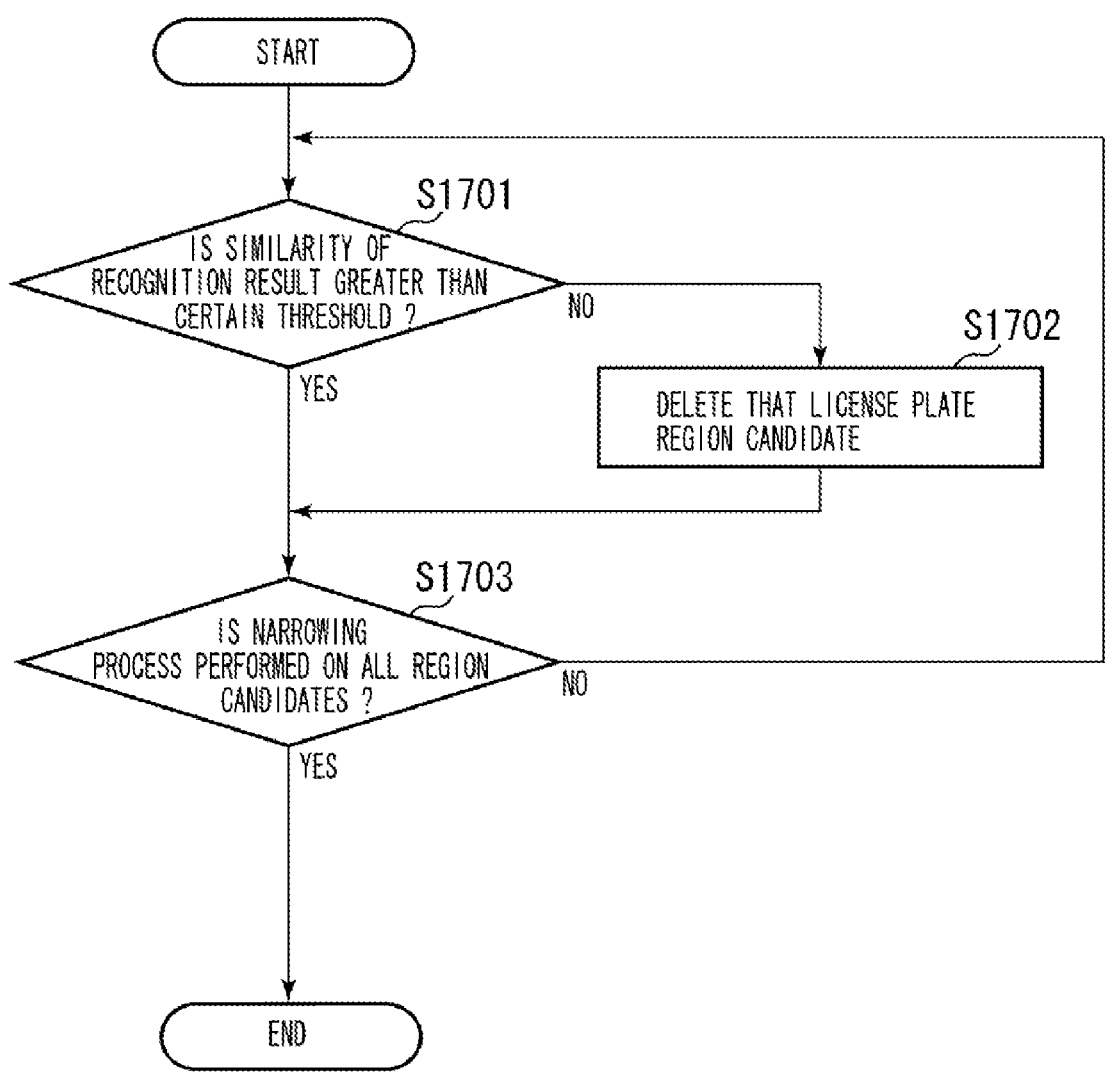
FIG. 17 is a flowchart of processing for narrowing down from information of an individual license plate region candidate according to an exemplary embodiment of the present invention.

In step S501 of FIG. 5, the CPU 101 narrows down the license plate region candidates based on information of individual license plate region candidates. FIG. 6 is a flowchart illustrating details of the processing in step S501 of FIG. 5 for narrowing region candidates down based on information of an individual license plate region candidate with respect to a Japanese license plate. In addition, FIG. 17 is a flowchart illustrating details of the processing in step S501 for narrowing region candidates down based on information of an individual license plate region candidate with respect to an American license plate.

First, details of processing in step S501 of FIG. 5 will be described referring to FIG. 6 using the Japanese license plate as an object.

In step S601, the CPU 101 uses one of the plurality of license plate region candidates as a processing object and determines whether the similarity to the character recognition result of the character string within the license plate region candidates of the processing object is larger than a predetermined threshold value. Determination can be made whether an average value of the similarity of the character string included in the license plate region candidate is larger than the threshold value, or determination can be made whether the similarity of the whole characters is larger than the threshold value by comparing the similarity in every character. In the character recognition of the present exemplary embodiment, the larger the similarity is, the more the character is similar to the character registered in the dictionary. In cases where the similarity is larger than the predetermined threshold value (YES in step S601), processing advances to step S602. If the similarity is not larger the predetermined threshold value (NO in step S601), the processing advances to step S604.

In step S602, the CPU 101 determines whether an X-coordinate on a right end of a rectangle 301 surrounding the name of the Department of Motor Vehicle and the classification number within the Japanese license plate region candidate is smaller than an X-coordinate on a left end of a rectangle surrounding number of the rightmost end of the series of designated number. When the X-coordinate on the right end is determined smaller than the X-coordinate on the left end (YES in step S602), the processing advances to step S603. If the X-coordinate on the right end is not smaller than the X-coordinate on the left end (NO in step S602), the processing advances to step S604.

In step S603, the CPU 101 determines whether an X-coordinate on a left end of a rectangle 301 surrounding the name of the Department of Motor Vehicle and the classification number within the Japanese license plate region candidate is larger than an X-coordinate of a right end of a rectangle 302 surrounding the Hiragana. When the X-coordinate on the left end is determined larger than the X-coordinate on the right end (YES in step S603), the processing advances to step S605. If the X-coordinate on the left end is not larger than the X-coordinate on the right end (NO in step S603), the processing advances to step S604.

In step S604, the CPU 101 deletes the license plate region candidate regarded as the narrowing down processing object from the candidate.

In step S605, the CPU 101 determines whether the narrowing down processing is performed for all license plate region candidates. If it is determined that the narrowing down processing is performed for all license plate region candidates (YES in step S605), the CPU 101 terminates the narrowing down processing (step S501) based on the information of the individual license plate region candidate. On the other hand, if there is an unprocessed region (NO in step S605), the processing returns to step S601 and the CPU 101 repeats the processing with the next region candidate as the processing object.

Figure 7:
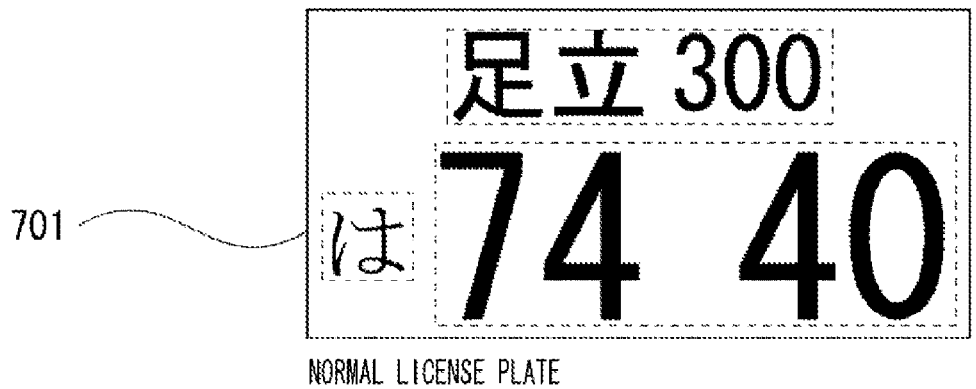
FIG. 7 is a view illustrating an example of a license plate region in which a character absence occurs and a screw is extracted.
Figure 7:
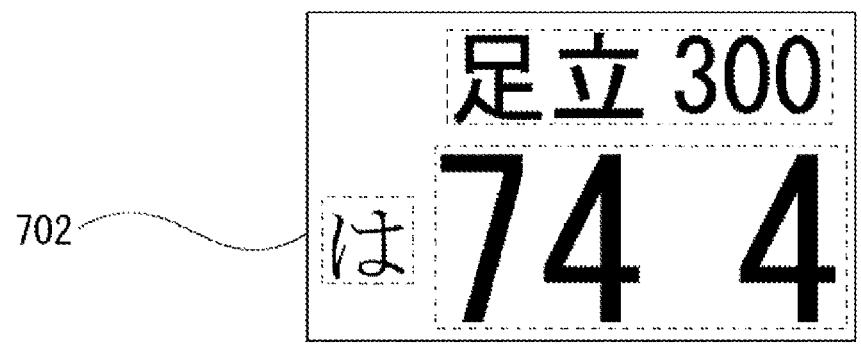
Figure 7:
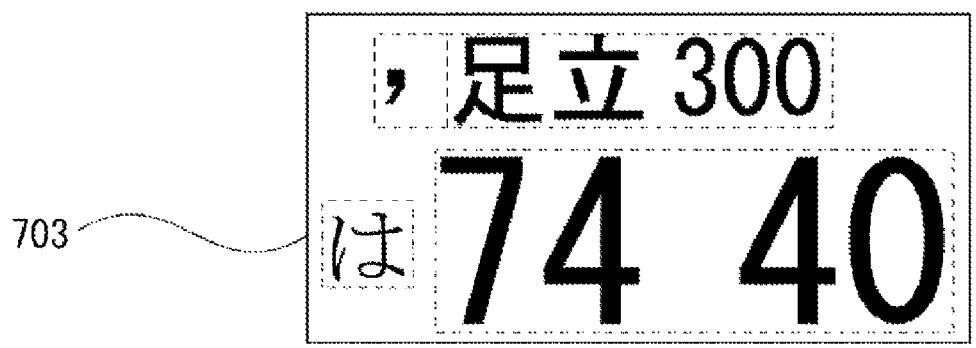

FIG. 7 is an example of the Japanese license plate region candidate.

An example of a normal license plate region candidate is illustrated in a reference number 701. In this case, an X-coordinate on a right end of a rectangle surrounding the name of the Department of the Motor Vehicle and the classification number is smaller than an X-coordinate of a left end on a rectangle surrounding a number ("0") of the rightmost end of a series of designated number. In addition, an X-coordinate on a left end of the rectangle surrounding the name of the Department of Motor Vehicle and the classification number is larger than an X-coordinate on a right end of a rectangle surrounding Hiragana. Therefore, since this license plate region candidate is determined as YES in step S602 and YES in step S603, the license plate region candidate is not deleted.

An example of the license plate region candidate in which a number of the rightmost end of the series of designated number is absent is illustrated in a reference number 702. In this case, an X-coordinate on a right end of a rectangle surrounding the name of the Department of Motor Vehicle and the classification number is larger than an X-coordinate of a left end on a rectangle of a number ("4") of the rightmost end of the series of designated number. Therefore, determination is NO in step S602 and the license plate region candidate is deleted from the candidate in step 604.

An example of the license plate region candidate in cases where an image of a screw for fixing the license plate on a left side of the name of the Department of Motor Vehicle and the classification number is misrecognized as a character is illustrated in a reference number 703. At this time, the screw part is determined as a part of a character region including the name of the Department of Motor Vehicle and the classification number. In this case, the X-coordinate on the left end of the rectangle surrounding the name of the Department of Motor Vehicle and the classification number in the license plate region becomes smaller than the X-coordinate on the right end of the rectangle of the Hiragana. Therefore, determination is NO in step S603 and the license plate region candidate is deleted from the candidate in step S604.

Next, details of the processing of step S501 of FIG. 5 will be described referring to FIG. 17 using an American license plate as an object.

In step S1701, the CPU 101 chooses one of plural license plate region candidates as a processing object and determines whether the similarity to a character recognition result of a character string within the license plate region candidates of the processing object is larger than a predetermined threshold value. Determination can be made whether an average value of the similarities of the character string included in the license plate region candidates is larger than the threshold value, or whether the similarity of all characters is larger than the threshold value by comparing the similarity in every character. In the character recognition of the present exemplary embodiment, the larger the similarity is, the more the character is similar to the character registered in the dictionary. In cases where the similarity is larger than the threshold value (YES in step S1701), processing advances to step S1703. In cases where the similarity is not greater than the threshold value (NO in step S1701), the processing advances to step S1702.

In step S1702, the CPU 101 deletes the license plate region candidate regarded as the processing object from the candidate.

In step S1703, the CPU 101 determines whether the narrowing down processing is performed for all license plate region candidates. If it is determined that the narrowing down processing is performed for all license plate region candidates (YES in step S1703), the CPU 101 terminates the narrowing down processing (S501) based on the information of the license plate region candidate. On the other hand, if there is an unprocessed region candidate (NO in step S1703), the process returns to step S1701 and the CPU 101 repeats the processing with the next region candidate as the processing object.

In the flowchart of FIG. 17, although the narrowing down of the license plate region candidate is performed by using the similarity of the recognition result, it is not necessarily to be limited to this. For instance, in cases where position relationship of a plurality of character strings written on the license plate is predetermined, as in step S602 or step S603 of FIG. 6, the CPU 101 can perform the narrowing down by comparing position information of each character string (position coordinates of a character string of the name of the state and a character string of alphanumeric characters) and determining whether a prescribed condition is met.

Figure 8:
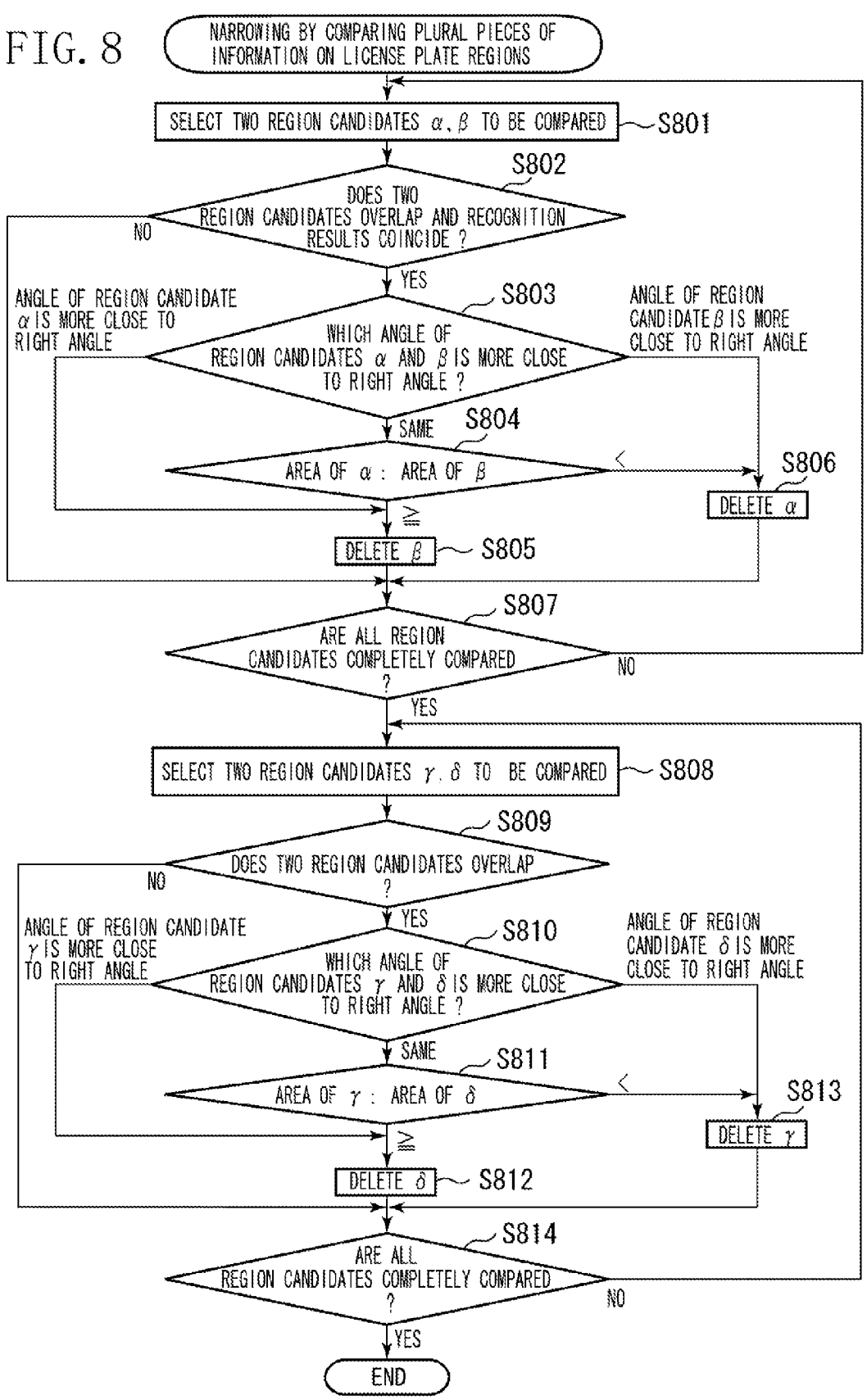
FIG. 8 is a flowchart of narrowing down processing by comparing information of plural license plate region candidates according to an exemplary embodiment of the present invention.

In step S502 of FIG. 5, the CPU 101 compares information of plural license plate region candidates (position/shape information of the quadrangle and character recognition result information) to narrow down. The information obtained by extracting the license plate region candidate can be utilized as the information of the quadrangle, illustrated in FIG. 13. FIG. 8 is a flowchart illustrating details of narrowing down processing (S502) which compares information of the plurality of license plate region candidates.

In step S801, the CPU 101 selects two license plate region candidates α and β as the objects of comparison among the plurality of license plate region candidates.

In step S802, the CPU 101 determines whether two rectangles selected in step S801 overlap and two character recognition results are identical. When it is determined that both conditions are met (YES in step S802), the processing advances to step S803. If both conditions are not met (NO in step S802), the processing advances to step S807.

In step S803, the CPU 101 inspects which quadrangle is closer to a right angle based on the shape of the quadrangle of the license plate region candidates α and β. For instance, the CPU 101 computes an absolute value of the difference between an angle and 90 degree angle for the respective angles of the quadrangle, compares average values of the difference, and determines that the angle having smaller average value of the difference is closer to the right angle. When both are identical, the processing advances to step S804. When the region candidate α is closer to the right angle, the processing advances to step S805, and when the region candidate β is closer to the right angle, the processing advances to step S806.

In step S804, the CPU 101 compares areas of the region candidates α and β of the license plate region candidates. If a size of the area of the region candidate α is the same or larger than a size of the area of the region candidate β, the processing advances to step S805. If not, the processing advances step S806.

In step S805, the CPU 101 deletes the license plate region candidate β as out of the candidate. On the other hand, in step S806, the CPU 101 deletes the license plate region candidate α as out of the candidate.

In step S807, the CPU 101 checks whether all comparisons between rectangles are completed. When the comparison is completed (YES in step S807), the processing advances to step S808. When the comparison is not completed (NO in step S807), the processing returns to step S801.

In step S808, the CPU 101 selects two license plate region candidates γ and δ as the objects of comparison among license plate region candidates remaining after executing the steps S801-S807.

In step S809, the CPU 101 inspects whether two license plate region candidates γ and δ selected in step S808 overlap. If two region candidates overlap (YES in step S809), the processing advances to step S810. If two region candidates do not overlap (NO in step S809), the processing advances to step S814.

In step S810, the CPU 101 inspects which of the license plate region candidates γ and δ is closer to right angle. For instance, the CPU 101 computes an absolute value of the difference between an angle and 90 degree angle for the respective angles of the quadrangle, compares average values of the difference, and determines that the angle having smaller average value of the difference is closer to the right angle. When both are identical, the processing advances to step S811. When the region candidate γ is closer to the right angle, the processing advances to step S812, and when the region candidate δ is closer to the right angle, the processing advances to step S813.

In step S811, the CPU 101 compares areas of the region candidates γ and δ of the license plate region candidates. If a size of the area of the region candidate γ is the same or larger than a size of the area of the region candidate δ, the processing advances to step S812. If not, the processing advances to step S813.

In step S812, the CPU 101 deletes the license plate region candidate δ as out of the candidate. On the other hand, in step S813, the CPU 101 deletes the license plate region candidate γ as out of the candidate.

In step S814, the CPU 101 checks whether all comparisons between rectangles are completed. When the comparison is completed (YES in step S814), the CPU 101 terminates the narrowing down processing by comparing information of the plurality of license plate region candidates. If the comparison is not completed (NO in step S814), the processing returns to step S808.

That is, in steps S801 to S807, the CPU 101 first groups the license plate region candidates into those which are overlapped and whose character recognition results are identical, then selects one candidate from among the groups. On the other hand, in steps S808 to S814, the CPU 101 groups the rectangles of the license plate region candidates into those which overlap, then selects one candidate from among the groups. Thus, the CPU 101 first groups the candidates having the same character recognition result to select the candidate, then, the CPU 101 further groups the candidates having different character recognition results to select the candidate. Since the CPU 101 previously selects a candidate which is closer to the right angle as the candidate from among candidates having the same character recognition result, the quadrangle of the license plate overlaps with the quadrangle of the other license plate (quadrangle of the other character recognition result) and it can avoid erroneously deleting the quadrangle.

Figure 9:
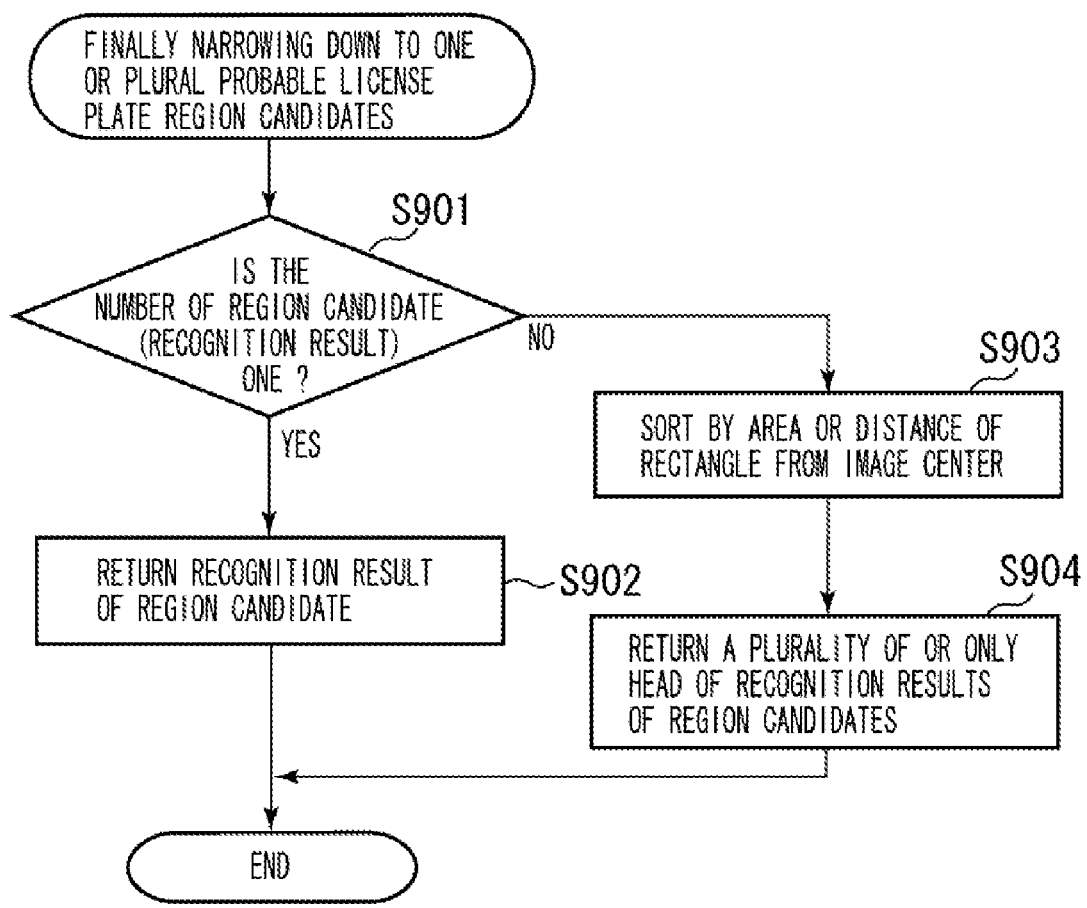
FIG. 9 is a flowchart of processing for narrowing down finally into one or plural probable license plate region candidates according to an exemplary embodiment of the present invention.

In step S503 of FIG. 5, the CPU 101 narrows down the recognition results of output objects based on preset conditions (a sorting condition and a required number of the recognition results) from among the license plate region candidates narrowed down by steps S501 and S502. FIG. 9 is a flowchart illustrating details of the processing of step S503.

In step S901, the CPU 101 determines whether the number of the license plate region candidates (recognition results) narrowed down by steps S501 and S502 is one. If the number is one (YES in step S901), the processing advances to step S902. If the number is not one, the processing advances to step S903.

In step S902, the CPU 101 returns (outputs) the character recognition result of the license plate. At this time, the CPU 101 can output position information of the region candidate or the like together therewith.

In step S903, the CPU 101 sorts plural remaining license plate region candidates. Although the sorting condition is set beforehand, a user can change the sorting condition. For instance, an order of the area sizes of the license plate region candidates or an order of position being closer to the center of the photographed image can be the sorting condition.

In step S904, the CPU 101 selects the region candidate based on the output setting number and returns (outputs) the character recognition result one by one from a head of the license plate region candidates sorted. At this time, the CPU 101 can output position information of the region candidate or the like together therewith. The output setting number is set beforehand; however a user can change the output setting number.

In the present exemplary embodiment, an example to recognize a license plate in an image photographed by a user using a digital camera or the like is described. However, the present invention is not limited to this exemplary embodiment and can be applied to an automatically photographing apparatus which is installed fixedly or movably at the road side.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-053049 filed Mar. 2, 2007, which is hereby incorporated by reference herein in its entirety.

What is claimed is:

1. A license plate recognition apparatus comprising:
a detection unit configured to detect a plurality of quadrangles of license plate region candidates from input images;
a character recognition unit configured to execute character recognition of a character region included in the detected license plate region candidates; and
an output unit configured to select a license plate region candidate to be output from among the plurality of license plate region candidates detected by the detection unit based on a character recognition result and the information of the quadrangle of the respective license plate region candidates and output information relating to the selected license plate region candidate,
wherein the output unit, in cases where positions of the license plate region candidates overlap, narrows the license plate region candidates to be selected by leaving the license plate region candidate whose angle of a quadrangle of the respective license plate region candidates is closer to a right angle, as the candidates.

2. The license plate recognition apparatus according to claim 1, wherein the output unit, in cases where angles of the quadrangles of the respective license plate region candidates are identical, narrows the license plate region candidates to be selected based on areas of the respective quadrangles.

3. The license plate recognition apparatus according to claim 1, wherein the output unit performs narrowing down processing of the license plate region candidates whose character recognition results are identical and whose positions overlap and then performs the narrowing down processing of the license plate region candidates whose character recognition results are different and whose positions overlap.

4. The license plate recognition apparatus according to claim 1, wherein the output unit narrows down the license plate region candidate to be selected based on the character recognition result of the license plate region candidate and the position of the character region included in the license plate region candidate.

5. The license plate recognition apparatus according to claim 1, wherein the output unit, in cases where there are the plurality of license plate region candidates, selects the license plate region candidates to be output after sorting the license plate region candidates based on a size order of an area of the license plate region candidate or an order of a position close to a center of the input images, and outputs information relating to the selected license plate region candidate.

6. The license plate recognition apparatus according to claim 1, wherein the detection unit detects the quadrangle of the license plate region candidate by detecting connected pixel rows arranged in a straight line shape from the input images, setting a processing object range based on the connected pixel rows detected, and executing processing to detect the quadrangle in the processing object range set.

7. A method for causing a license plate recognition apparatus to execute operations in such a way that a computer of the license plate recognition apparatus executes a computer program, the operations comprising:
detecting a plurality of quadrangles of license plate region candidates from input images;
executing character recognition of a character region included in the license plate region candidates detected; and
selecting a license plate region candidate to be output from among the plurality of license plate region candidates detected based on a character recognition result and information of the quadrangle of the respective license plate region candidates and outputting information relating to the selected license plate region candidates,
wherein in cases where positions of the license plate region candidates overlap, narrows the license plate region candidates to be selected by leaving the license plate region candidate whose angle of a quadrangle of the respective license plate region candidates is closer to a right angle, as the candidates.

8. A non-transitory computer readable storage medium storing a computer program, in which the computer program causes a computer to execute operations comprising:
detecting a plurality of quadrangles of license plate region candidates from input images;
executing character recognition of a character region included in the license plate region candidates detected; and
selecting a license plate region candidate to be output from among the plurality of license plate region candidates detected based on character recognition result and information of the quadrangle of the respective license plate region candidates and outputting information relating to the selected license plate region candidates,
wherein in cases where positions of the license plate region candidates overlap, narrows the license plate region candidates to be selected by leaving the license plate region candidate whose angle of a quadrangle of the respective license plate region candidates is closer to a right angle, as the candidates.

9. The computer readable storage medium according to claim 8, the operations further comprising:
narrowing the license plate region candidates to be selected based on areas of the respective quadrangles, in cases where angles of the quadrangles of the respective license plate region candidates are identical.

10. The computer readable storage medium according to claim 8, the operations further comprising:
performing narrowing down processing of the license plate region candidates whose character recognition results are identical and whose positions overlap and then performing narrowing down processing of the license plate region candidates whose character recognition results are different and whose positions overlap.

11. The computer readable storage medium according to claim 8, the operations further comprising:
narrowing down the license plate region candidates to be selected based on the character recognition result of the license plate region candidates and the position of the character region included in the license plate region candidates.

12. The computer readable storage medium according to claim 8, the operations further comprising:
selecting the license plate region candidates to be output after sorting the license plate region candidates based on a size order of an area of the license plate region candidates or an order of a position of the license plate region candidates existing close to a center of the input images, and outputting information relating to the license plate region candidate selected, in cases where there are the plurality of license plate region candidates.

13. The computer readable storage medium according to claim 8, the operations further comprising:
detecting the quadrangle of the license plate region candidates by detecting a connected pixel row arranged in a straight line shape from the input images, setting a processing object range based on the connected pixel row detected, and executing processing to detect the quadrangle in the processing object region set.

14. The method according to claim 7, the operations further comprising:
narrowing the license plate region candidates to be selected based on areas of the respective quadrangles, in cases where angles of the quadrangles of the respective license plate region candidates are identical.

15. The method according to claim 7, the operations further comprising:
performing narrowing down processing of the license plate region candidates whose character recognition results are identical and whose positions overlap and then performing narrowing down processing of the license plate region candidates whose character recognition results are different and whose positions overlap.

16. The method according to claim 7, the operations further comprising:
narrowing down the license plate region candidates to be selected based on the character recognition result of the license plate region candidates and the position of the character region included in the license plate region candidates.

17. The method according to claim 7, the operations further comprising:
selecting the license plate region candidates to be output after sorting the license plate region candidates based on a size order of an area of the license plate region candidates or an order of a position of the license plate region candidates existing close to a center of the input images, and outputting information relating to the license plate region candidate selected, in cases where there are the plurality of license plate region candidates.

18. The method according to claim 7, the operations further comprising:
detecting the quadrangle of the license plate region candidates by detecting a connected pixel row arranged in a straight line shape from the input images, setting a processing object range based on the connected pixel row detected, and executing processing to detect the quadrangle in the processing object region set.

* * * * *